US012585373B2

(12) United States Patent
Grantham et al.

(10) Patent No.: US 12,585,373 B2
(45) Date of Patent: Mar. 24, 2026

(54) INTERFACE TO DISPLAY SHARED USER GROUPS

(71) Applicant: Snap Inc., Santa Monica, CA (US)

(72) Inventors: Matthew Colin Grantham, Toronto (CA); Jeremy Voss, Los Angeles, CA (US); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/498,751

(22) Filed: Oct. 31, 2023

(65) Prior Publication Data

US 2024/0061559 A1 Feb. 22, 2024

Related U.S. Application Data

(63) Continuation of application No. 17/580,321, filed on Jan. 20, 2022, now Pat. No. 11,868,590, which is a continuation of application No. 17/113,832, filed on Dec. 7, 2020, now Pat. No. 11,294,545, which is a continuation of application No. 16/141,612, filed on Sep. 25, 2018, now Pat. No. 10,895,964.

(51) Int. Cl.
*G06F 3/0484* (2022.01)
*G06F 3/0482* (2013.01)
*H04L 12/18* (2006.01)

(52) U.S. Cl.
CPC .......... *G06F 3/0484* (2013.01); *G06F 3/0482* (2013.01); *H04L 12/1822* (2013.01)

(58) Field of Classification Search
CPC .............................. G06F 3/0484; G06F 3/0482
See application file for complete search history.

(56) References Cited

U.S. PATENT DOCUMENTS

| | | | | |
|---|---|---|---|---|
| 9,411,506 B1 * | 8/2016 | Prado | ...................... | H04L 51/52 |
| 10,848,445 B1 * | 11/2020 | Willmann | ............. | H04L 51/046 |
| 2011/0010641 A1 * | 1/2011 | Wolff | ................... | G06Q 10/107 |
| | | | | 715/753 |
| 2012/0110096 A1 * | 5/2012 | Smarr | ................... | H04L 65/403 |
| | | | | 709/204 |
| 2012/0331405 A1 * | 12/2012 | Eidelson | ........... | H04M 1/72436 |
| | | | | 715/758 |
| 2013/0218967 A1 * | 8/2013 | Chau | ...................... | G06Q 50/01 |
| | | | | 709/204 |
| 2014/0122605 A1 * | 5/2014 | Merom | ................... | G06Q 10/10 |
| | | | | 709/204 |
| 2014/0351351 A1 * | 11/2014 | Yu | ........................... | H04L 51/52 |
| | | | | 709/206 |

(Continued)

*Primary Examiner* — Asher D Kells

(74) *Attorney, Agent, or Firm* — Schwegman Lundberg & Woessner, P.A.

(57) ABSTRACT

A system to generate a graphical user interface to display a presentation of a set of shared user groups between users of a social networking service is described. Embodiments of the present disclosure relate generally to systems for: receiving an identification of a second user from a user account of a first user; identifying a user group that includes the first user and the second user in response to the identification of the second user from the user account of the first user; retrieving user identifiers of the first user and the second user, wherein the user identifiers may include graphical avatars; generating a group identifier based on the user identifiers; and causing display of a presentation of the user group at a client device.

13 Claims, 13 Drawing Sheets

(56)                         References Cited

U.S. PATENT DOCUMENTS

| 2017/0109013 A1* | 4/2017 | Hong | H04L 51/00 |
| 2018/0351903 A1* | 12/2018 | Allen | H04L 51/234 |
| 2019/0012059 A1* | 1/2019 | Kwon | G06F 3/0481 |
| 2022/0137761 A1 | 5/2022 | Grantham et al. | |

* cited by examiner

100

MESSAGING CLIENT APPLICATION
104

EPHEMERAL TIMER
SYSTEM 202

COLLECTION
MANAGEMENT
SYSTEM 204

CURATION
INTERFACE 208

ANNOTATION
SYSTEM 206

APPLICATION SERVER
112

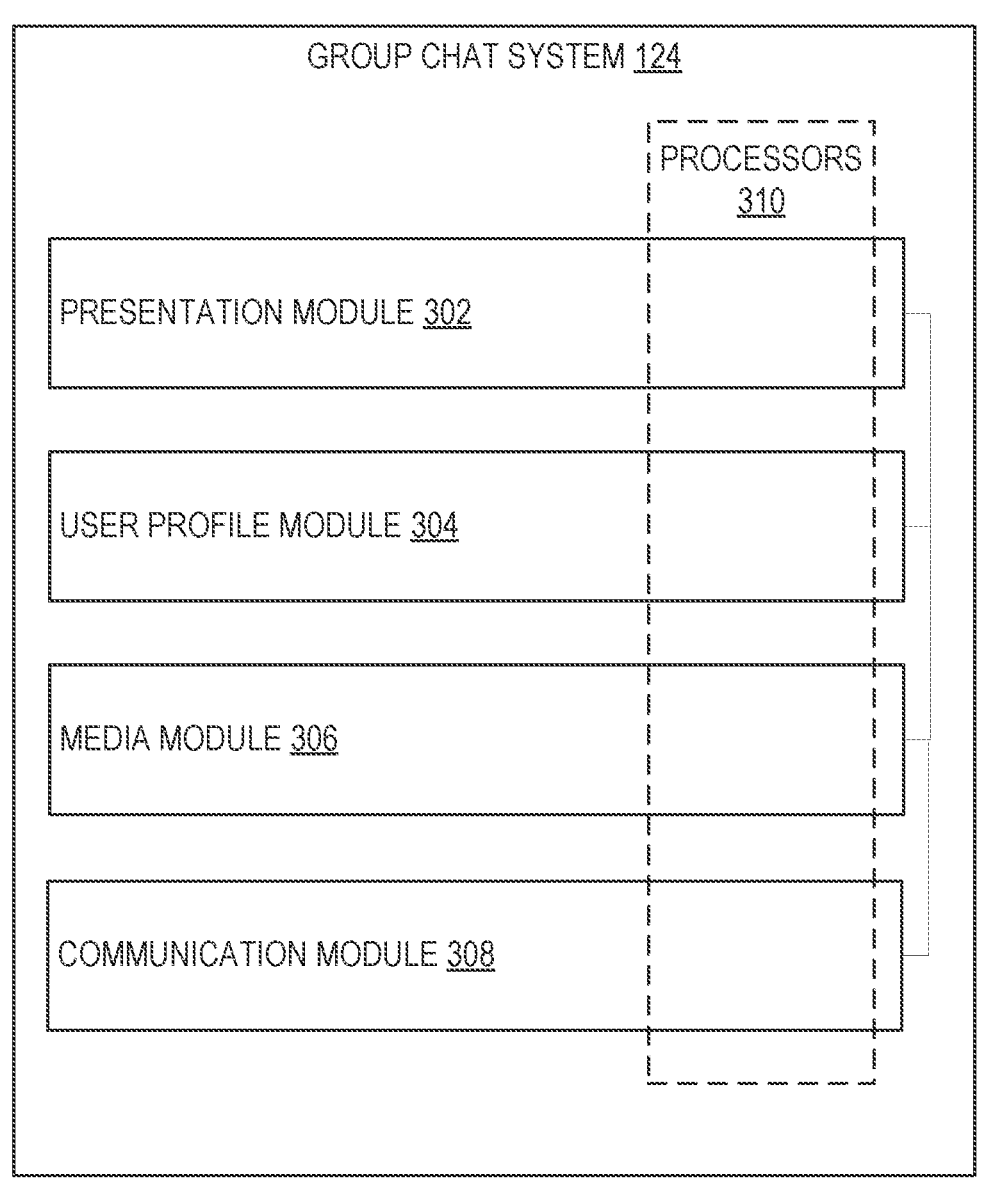
*FIG. 3*

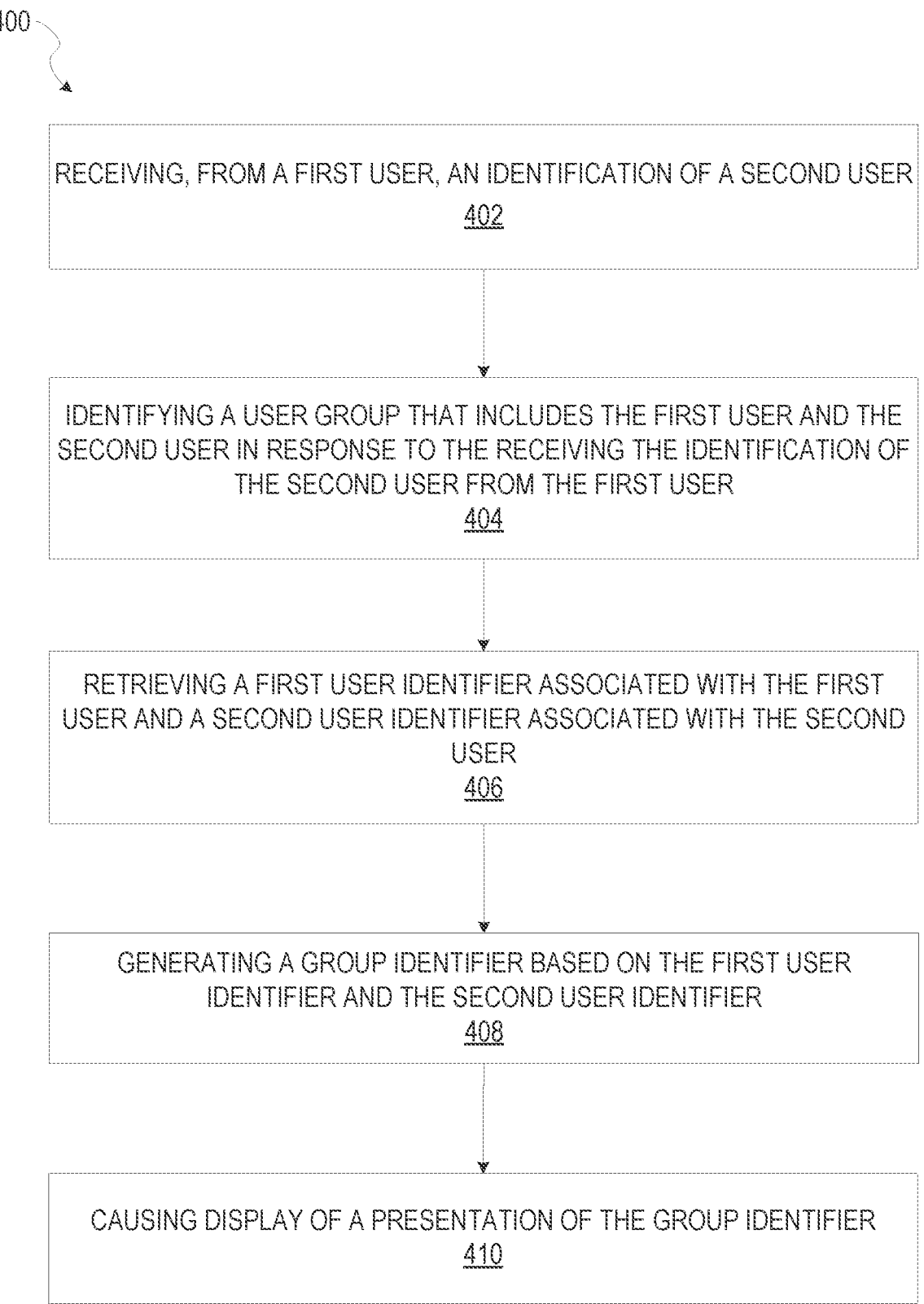

400

RECEIVING, FROM A FIRST USER, AN IDENTIFICATION OF A SECOND USER
402

IDENTIFYING A USER GROUP THAT INCLUDES THE FIRST USER AND THE
SECOND USER IN RESPONSE TO THE RECEIVING THE IDENTIFICATION OF
THE SECOND USER FROM THE FIRST USER
404

RETRIEVING A FIRST USER IDENTIFIER ASSOCIATED WITH THE FIRST
USER AND A SECOND USER IDENTIFIER ASSOCIATED WITH THE SECOND
USER
406

GENERATING A GROUP IDENTIFIER BASED ON THE FIRST USER
IDENTIFIER AND THE SECOND USER IDENTIFIER
408

CAUSING DISPLAY OF A PRESENTATION OF THE GROUP IDENTIFIER
410

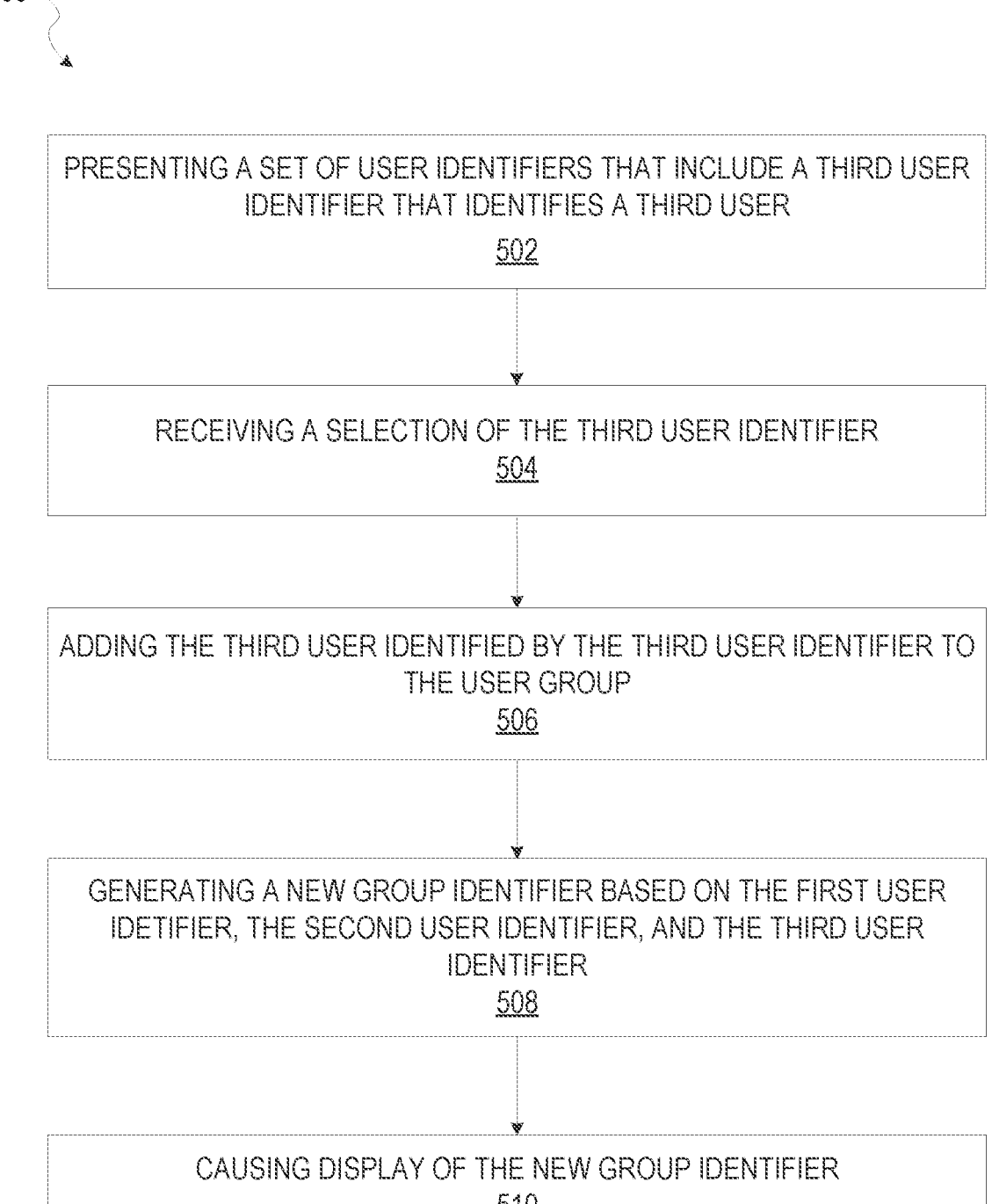

PRESENTING A SET OF USER IDENTIFIERS THAT INCLUDE A THIRD USER IDENTIFIER THAT IDENTIFIES A THIRD USER
502

RECEIVING A SELECTION OF THE THIRD USER IDENTIFIER
504

ADDING THE THIRD USER IDENTIFIED BY THE THIRD USER IDENTIFIER TO THE USER GROUP
506

GENERATING A NEW GROUP IDENTIFIER BASED ON THE FIRST USER IDETIFIER, THE SECOND USER IDENTIFIER, AND THE THIRD USER IDENTIFIER
508

CAUSING DISPLAY OF THE NEW GROUP IDENTIFIER
510

FIG. 5

600
RECEIVING A SELECTION OF THE PRESENTATION OF THE GROUP
IDENTIFIER
602
CAUSING DISPLAY OF A CHAT TRANSCRIPT ASSOCIATED WITH THE USER
GROUP IDENTIFIED BY THE GROUP IDENTIFIER
604
*FIG. 6*

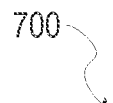

700

RECEIVING A USER INPUT THAT SELECTS THE PRESENTATION OF THE
GROUP IDENTIFIER, THE USER INPUT COMPRISING AN INPUT ATTRIBUTE
THAT INCLUDES A DURATION
702

DETERMINING THAT THE DURATION OF THE USER INPUT TRANSGRESSES
A THRESHOLD VALUE
704

CAUSING DISPLAY OF A GROUP PROFILE ASSOCIATED WITH THE USER
GROUP IN RESPONSE TO THE DETERMINING THAT THE DURATION
TRANSGRESSES THE THRESHOLD VALUE, THE GROUP PROFILE
COMPRISING A DISPLAY OF AT LEAST THE FIRST USER IDENTIFIER AND
THE SECOND USER IDENTIFIER
706

RECEIVING A USER INPUT THAT IDENTIFIES A USER GROUP
802

CAUSING DISPLAY OF A TRANSCRIPT ASSOCIATED WITH THE USER GROUP IN RESPONSE TO THE USER INPUT THAT IDENTIFIES THE USER GROUP
804

900

INTERFACE TO DISPLAY SHARED USER GROUPS

CROSS-REFERENCE TO RELATED

This application is a continuation of U.S. patent application Ser. No. 17/580,321, filed Jan. 20, 2022, which application is a continuation of U.S. patent application Ser. No. 17/113,832, filed Dec. 7, 2020, now issued as U.S. Pat. No. 11,294,545, which application is a continuation of U.S. patent application Ser. No. 16/141,612, filed Sep. 25, 2018, now issued as U.S. Pat. No. 10,895,964, all of which are incorporated by reference herein in their entireties.

TECHNICAL FIELD

Embodiments of the present disclosure relate generally to graphical user interfaces (GUI), and more particularly, to systems for generating and causing display of GUIs.

BACKGROUND

A "group", or "group chat," is a feature in many social networking services which allows users to communicate and interact with one or more users through the exchange of media that include text, audio, images, and videos. Participants of the group chat are presented with a graphical user interface to display messages received from a plurality of user participating in the group chat.

A given user may participate simultaneously in multiple group chats, where each group chat may be defined based on a number of attributes or features, such as a list of participants. Each group chat therefore comprises its own corresponding graphical user interface to display messages received from the participants. Group chats are typically accessible through a chat interface that may simply display all chat sessions which a user is participating in simultaneously. For example, in order to access a specific chat session/group, a user may need to search through several pages of chat sessions that may be sorted based on most recent activity. As a result, it is often difficult to sort and organize chat groups, and users often mistakenly send messages to incorrect groups.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a block diagram illustrating various modules of a group chat system, according to certain example embodiments.

FIG. 4 is a flowchart illustrating a method for generating and causing display of an interface to display shared user groups, according to certain example embodiments.

FIG. 5 is a flowchart illustrating a method for generating and causing display of an interface to display shared user groups, according to certain example embodiments.

FIG. 6 is a flowchart illustrating a method for generating and causing display of an interface to display shared user groups, according to certain example embodiments.

FIG. 7 is a flowchart illustrating a method for generating and causing display of an interface to display shared user groups, according to certain example embodiments.

DETAILED DESCRIPTION

Figure 1:
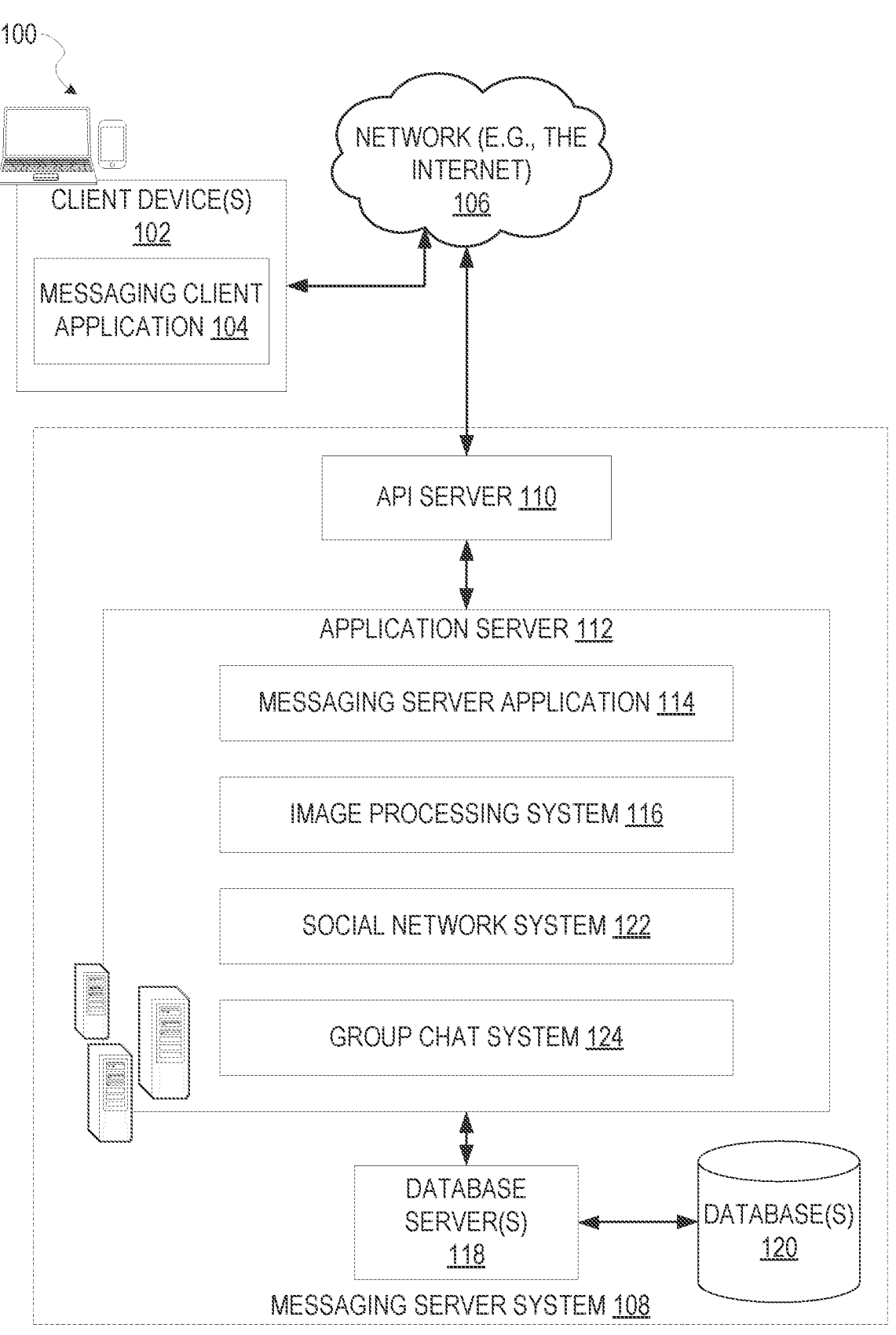
FIG. 1 is a block diagram showing an example messaging system for exchanging data (e.g., messages and associated content) over a network in accordance with some embodiments, wherein the messaging system includes a group chat system.

A system to generate and cause display of a graphical user interface (GUI) to display a presentation of a set of shared user groups between users of a social networking service is described. Embodiments of the present disclosure relate generally to improvements in systems that generate and present graphical user interfaces to display chat and messaging groups to users, that perform operations that may include: receiving an identification of a second user from a user account of a first user; identifying a user group that includes the first user and the second user in response to the identification of the second user from the user account of the first user; retrieving user identifiers of the first user and the second user, wherein the user identifiers may include graphical avatars (e.g., Bitmoji); generating a group identifier to be assigned to the user group, based on the user identifiers of the first user and the second user; and causing display of a presentation of the user group at a client device associated with the user account of the first user, wherein the presentation of the user group comprises a display of the group identifier.

In some embodiments, the presentation of the user group may include one or more graphical icons to receive inputs to adjust attributes of the user group. For example, the user may provide an input to change a display name of the user group, define a theme or subject of the user group, or to add one or more additional users to the user group. For example, in response to receiving an input to add a third user to a user group that comprises a first user and a second user, the system may retrieve a third user identifier associated with the third user, and generate a new user group identifier based on a first user identifier, a second user identifier, and the third user identifier.

In some embodiments, in response to receiving an input that selects the user group identifier, the system generates and causes display of a chat transcript associated with the user group, and an interface to generate and send messages to the user group. For example, the chat transcript may be stored at a memory location identified by the user group identifier within a memory repository of a client device, or at a database of the system. In response to receiving the input that selects the user group identifier, the system retrieves a chat transcript that comprises one or more messages received from the participants of the group chat, and displays the chat transcript within the GUI at a client device.

In further embodiments, the input includes a tactile input into a touch-input enabled device, wherein the input comprises input attributes such as a duration or contact pressure. In response to determining that the input attribute transgresses a predefined threshold value, the system may present a group profile associated with the user group. The group profile may for example include a display of a list of user identifiers of participants of the user group, as well as additional user group information such as a date and time of first message, last message, and a presentation of media items shared in the user group.

Consider an illustrative example from the perspective of a first user registered with a social networking service. The first user logs into their user account by providing credentials, and in response is presented with a search interface to provide inputs that identify a user account of a second user. For example, the search interface may comprise an input field to receive a text based input, or in some embodiments may comprise a presentation of a list of users that the user is connected with within the social networking service. In response to receiving an identification of the second user, the system identifies one or more group chats that include both the user and the second user.

The system retrieves a first user identifier of the first user and a second user identifier of the second user in response to identifying the user group that comprises the first user and the second user, and generated a user group identifier based on the first user identifier and the second user identifier. The system may then display the user group identifier within a GUI at a client device of the first user.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a group chat system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
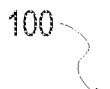
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time FIG. 3 is a block diagram illustrating components of the group chat system 124 that configure the group chat system 124 to generate and cause display of a GUI that includes a presentation of a media collection associated with a user, according to some example embodiments. The group chat system 124 is shown as including a presentation module 302, a user profile module 304, a media module 306, and a communication module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the group chat system 124 may physically include an arrangement of one or more of the processors 310 (e.g., a subset of or among the one or more processors of the machine) configured to perform the operations described herein for that module. As another example, any module of the group chat system 124 may include software, hardware, or both, that configure an arrangement of one or more processors 310 (e.g., among the one or more processors of the machine) to perform the operations described herein for that module. Accordingly, different modules of the group chat system 124 may include and configure different arrangements of such processors 310 or a single arrangement of such processors 310 at different points in time. Moreover, any two or more modules of the group chat system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for generating and causing display of an interface to shared user groups, according to certain example embodiments. Operations of the method 400 may be performed by the modules described above with respect to FIG. 3. As shown in FIG. 4, the method 400 includes one or more operations 402, 404, 406, 408, and 410.

At operation 402, the user profile module 304 receives, from a first user at a client device 102, an identification of a second user. For example, the first user may provide an input into a GUI, such as the GUI 1000 of FIG. 10 that selects or identifies the second user. The input may comprise a selection of a user identifier that identifies the second user, or in some embodiments may include a text input that identifies the second user.

At operation 404, the communication module 308 identifies a user group that includes the first user and the second user, in response to the user profile module 304 receiving the identification of the second user from the first user. For example, as discussed above, a user group (e.g., group chat) is a feature in many social networking services which allows users to communicate and interact with one or more users through the exchange of media that include text, audio, images, and videos, where participants of the user group are presented with a shared GUI to display messages received from a plurality of user participating in the group chat, in real-time. In some embodiments, the group chat system 124 may maintain a database of user groups (e.g., database 120), where each group chat is organized based on a list of participants to the user groups (i.e., user identifiers). Each user group may therefore comprise a list of user identifiers and a transcript of messages sent from the participants of the user group.

At operation 406, in response to the communication module 308 identifying the user group that includes both the first user and the second user, the user profile module 304 retrieves a first user identifier associated with the first user, and a second user identifier associated with the second user. The user identifiers may include graphical icon or avatars, such as Bitmoji that represent the users themselves. For example, the users may configure and personalize their corresponding user identifiers.

At operation 408, in response to the user profile module 304 retrieving the user identifiers of the first user and the second user, the media module 306 generates a group identifier to be associated to the user group that includes the first user and the second user, based on the first user identifier of the first user and the second user identifier of the second user.

In some embodiments, the media module 306 may generate the group identifier based on the user identifiers of the participants to the user group, as well as a theme or subject associated with the user group. The participants may define a theme of the user group by selecting a theme or subject from among a selection of themes. Each theme among the selection of themes may include corresponding display attributes, such as the inclusion of a graphical element, or display color. For example, a user defined theme of "sports" may cause the media module 306 to include graphical elements such as sporting equipment along with the user identifiers in the group identifier.

At operation 410, the presentation module 302 causes display of the group identifier generated based on at least the first user identifier and the second user identifier at the client device 102.

As an illustrative example from a user perspective, the first user may scroll through a list of user connections or contacts that includes the second user—similar to a contacts list. For example, the group chat system 124 may display a list of user identifiers that the user may scroll through to identify the second user.

In response to receiving an identification of the second user, the group chat system 124 causes display of a GUI (e.g., GUI 1200 of FIG. 12), that includes a presentation of all the shared user groups between the first user and the identifiers user (i.e., the second user). The system therefore provides the first user with a shortcut to access various user groups and conversations with the second user, through the GUI 1200. The first user may then provide an input selecting a user group from among the presentation of the shared user groups in order to access the user group.

FIG. 5 is a flowchart illustrating a method 500 for generating and causing display of an interface to shared user groups, according to certain example embodiments. Operations of the method 500 may be performed by the modules described above with respect to FIG. 3. As shown in FIG. 5, the method 500 includes one or more operations 502, 504, 506, 508, and 510.

Figure 10:
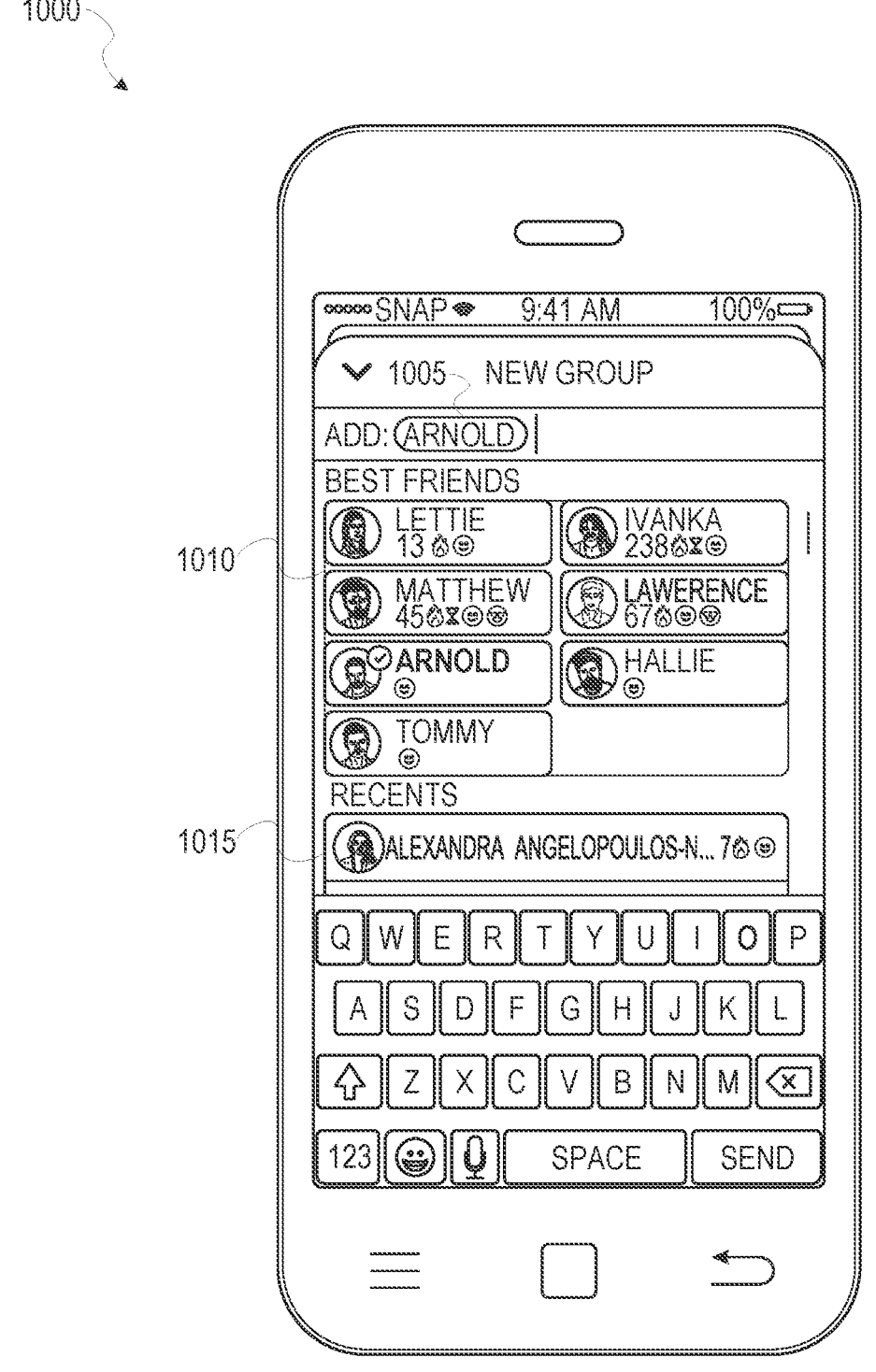
FIG. 10 is an interface diagram depicting a GUI to display shared user groups, according to certain example embodiments.

At operation 502, the presentation module 302 presents a set of user identifiers that include a third user identifier that identifies a third user, such as the GUI 1000 of FIG. 10. For example, a first user may be presented with the GUI 1200, to view all user groups shared between themselves and a second user. The first user may request to add one or more users to any of the user groups presented in the GUI 1200. In response to receiving the request to add users to any of the user groups, the presentation module 302 causes display of a presentation of a set of user identifiers. For example, the set of user identifiers may be retrieved from a list of connections associated with the first user, or may be based on proximity. For example, the list of user identifiers may identify users located within the same geo-fence as the first user.

At operation 504, the user profile module 304 receives a selection of the third user identifier from among the presentation of the set of user identifiers. For example, a user may provide a tactile input onto a position of the third user identifier among the presentation of the set of user identifiers, via the GUI 1000 through a client device 102. At operation 506, in response to receiving the selection of the third user identifier, the user profile module 304 adds the third user identified by the third user identifier to a user group.

At operation 508, in response to the user profile module 304 adding the third user identified by the third user identifier to the user group, the media module 306 generates a new group identifier for the user group based on the third user identifier and the user identifiers of the participants of the user group (e.g., a first user identifier of a first user and a second user identifier of a second user).

At operation 510, the presentation module causes display of the new user group identifier, or updates the user group identifier of the user group within a presentation of the user group.

FIG. 6 is a flowchart illustrating a method 600 for generating and causing display of an interface to shared user groups, according to certain example embodiments. Operations of the method 600 may be performed by the modules described above with respect to FIG. 3. As shown in FIG. 6, the method 600 includes one or more operations 602, and 604.

Figure 11:
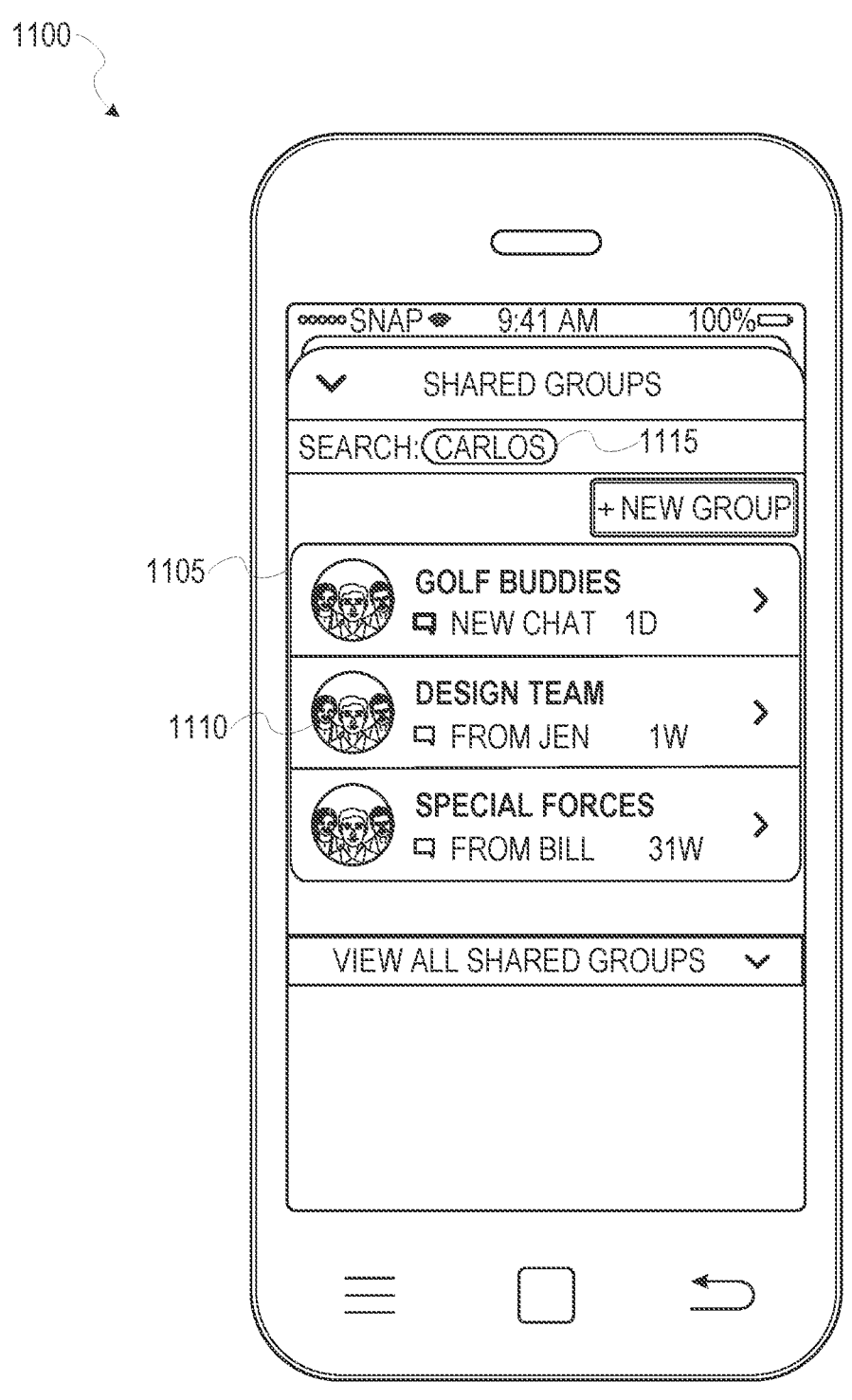
FIG. 11 is an interface diagram depicting a GUI to display shared user groups, according to certain example embodiments.

At operation 602, the communication module 308 receives a selection of a presentation of a group identifier that identifies a user group, such as the group identifier generated in the method 400 of FIG. 4, and as depicted by the group identifier 1110 of FIG. 11.

In response to receiving the selection of the group identifier that identifies the user group, at operation 604 the presentation module 302 retrieves and causes display of a chat transcript associated with the user group identified by the group identifier.

FIG. 7 is a flowchart illustrating a method 700 for generating and causing display of an interface to shared user groups, according to certain example embodiments. Operations of the method 700 may be performed by the modules described above with respect to FIG. 3. As shown in FIG. 7, the method 700 includes one or more operations 702, 704, and 706.

At operation 702, the user profile module 304 receives a user input that selects a presentation of a group identifier, wherein the user input comprises an input attribute that includes a duration or pressure. A user viewing the GUI 1100 as depicted in FIG. 11 may provide a tactile input onto a location of a display screen of a client device 102 that corresponds to the position of the group identifier 1110 among the set of group identifiers 1105. For example, the user may press and hold the position of the group identifier 1110 for a predefined period of time.

At operation 704, the communication module 308 determines that the duration or pressure of the user input transgresses a threshold value. For example, the threshold value may be a period of time or a threshold pressure.

At operation 706, in response to the communication module 308 determining that the duration or pressure of the user input has transgressed the threshold value, the presentation module 302 causes display of a group profile associated with the user group. The group profile may for example comprise a display of a set of user identifiers that identify participants of the group, as well as attributes of the user group such as when the last message was sent, when the user group was created, and how many users are in the user group.

Figure 8:
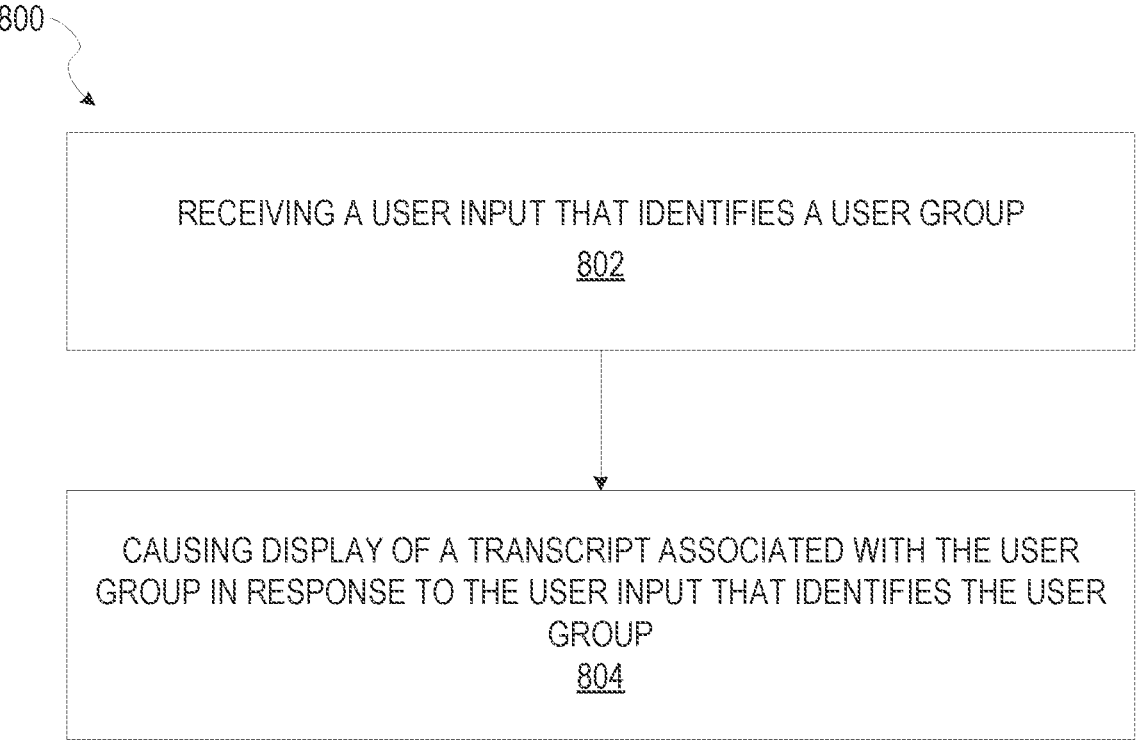
FIG. 8 is a flowchart illustrating a method for generating and causing display of an interface to display shared user groups, according to certain example embodiments.

FIG. 8 is a flowchart illustrating a method 800 for generating and causing display of an interface to shared user groups, according to certain example embodiments. Operations of the method 800 may be performed by the modules described above with respect to FIG. 3. As shown in FIG. 8, the method 800 includes one or more operations 802, and 804.

At operation 802, the communication module 308 receives a user input that identifies a user group. For example, the user input may include a tactile input that selects or otherwise identifies the user group identifier 1110 within the GUI 1100 as depicted in FIG. 11, or may comprise a text input that provides an identifier associated with the media collection.

At operation 804, in response to the communication module 308 receiving the user input that identifies the user group, the presentation module 302 causes display of a transcript associated with the user group identified by the user input.

Figure 9:
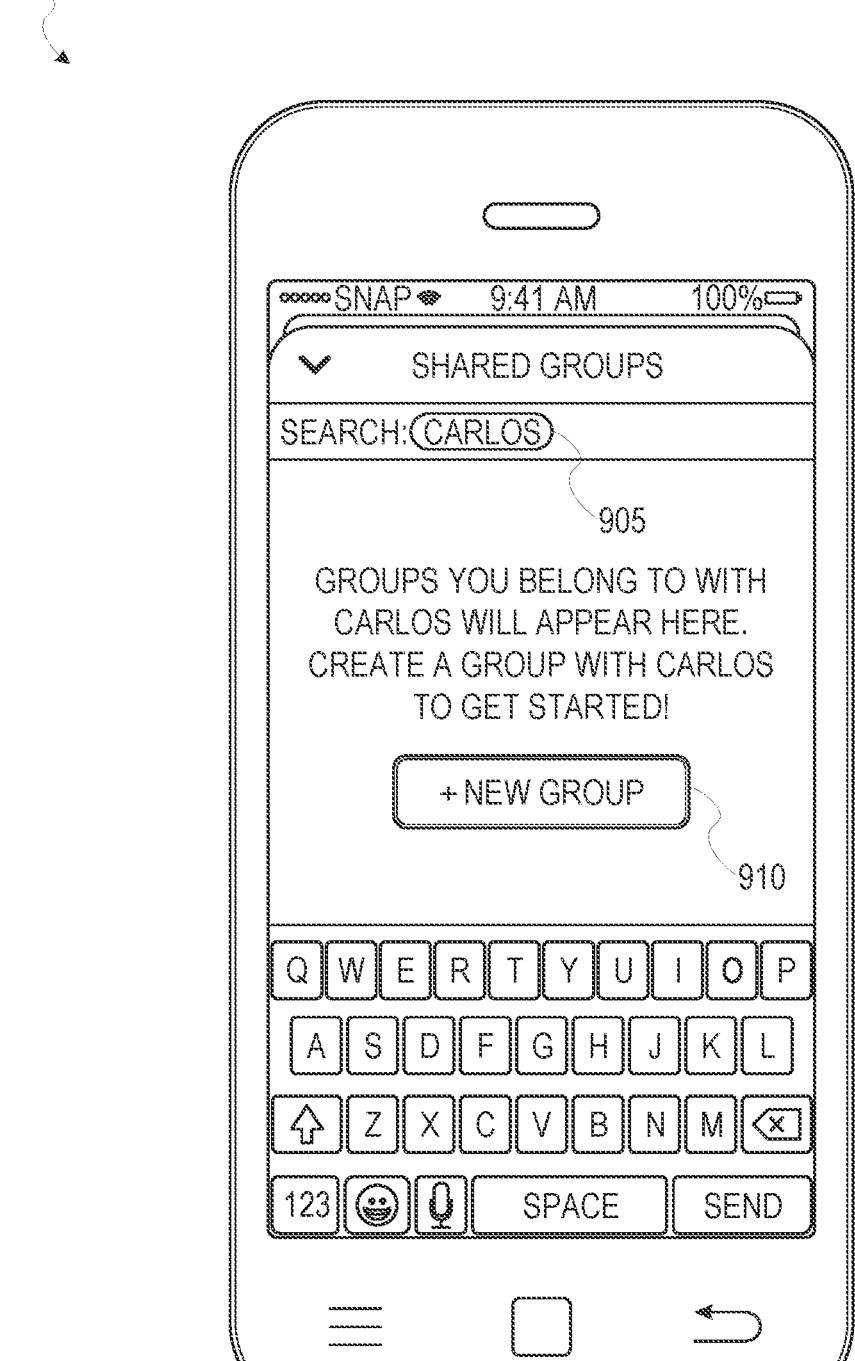
FIG. 9 is an interface diagram depicting a GUI to display shared user groups, according to certain example embodiments.

FIG. 9 is an interface diagram depicting a GUI 900 to display shared user groups, according to certain example embodiments, and as discussed in the method 400 of FIG. 4. As seen in FIG. 9, the GUI 900 comprises an identification of a user profile 905, and a graphical icon 910 to receive an input to define a new user group.

In some embodiments, the GUI 900 may be displayed by the group chat system 124 in response to determining that a first user does not share any user groups with a second user (i.e., the user identified by the user identifier 905). In response to determining that the first user does not share any user groups with the identified second user, the group chat system 124 presents the graphical icon 910. The first user may then select the graphical icon 910, and in response, the group chat system 124 may present the GUI 1000 as seen in FIG. 10 to define a new user group.

FIG. 10 is an interface diagram depicting a GUI 1000 to display shared user groups, according to certain example embodiments. As seen in FIG. 10, the GUI 1000 comprises a presentation of a user identifier 1005 selected or otherwise identified by a first user, and a set of user identifiers 1010 that may be added to a user group comprising a first user and a second user (identified by the user identifier 1005).

In some embodiments, in response to receiving an input selecting the graphical icon 910 as depicted in the GUI 900, the group chat system 124 presents the GUI 1000 to enable the user to define a new user group. In further embodiments, the GUI 1000 may also include a display of a recommended set of users 1015. For example, the recommended set of users 1015 may comprise a list of user identifiers of users that a first user communicated with within a predefined threshold period of time (e.g., a day, a week), or a threshold number of messages (e.g., 10 messages). As discussed in the method 500 depicted in FIG. 5, a first user may provide an input that selects a user identifier from among the set of user identifiers 1010 in order to add a user to a group chat.

FIG. 11 is an interface diagram depicting a GUI 1100 to display shared user groups, according to certain example embodiments. As seen in FIG. 11, the GUI 1100 comprises a presentation of a user identifier 1115 selected or otherwise identified by a first user, and a set of shared user groups 1105 that include both a first user and a second user (identified by the user identifier 1105).

As discussed in the method 400 of FIG. 4, a user group identifier 1110 may be generated by the group chat system 124 based on user identifiers associated with participants of the user group (e.g., a first user and a second user).

As discussed in the method 800 of FIG. 8, selecting the user group identifier 1110 may cause the group chat system 124 to cause display of a chat transcript associated with the user group identified by the user group identifier 1110 within the GUI 1100.

Software Architecture

Figure 12:
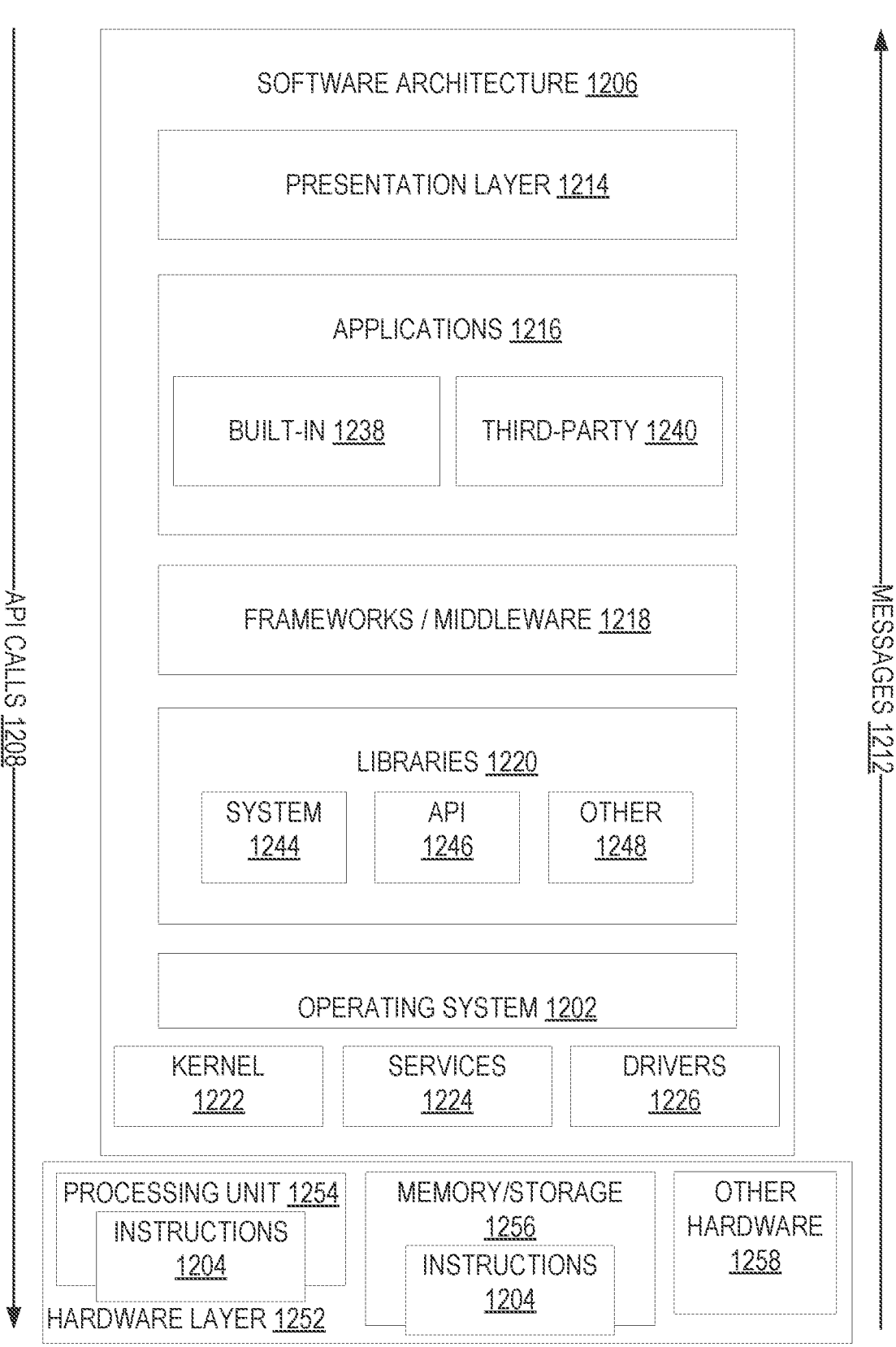
FIG. 12 is a block diagram illustrating a representative software architecture, which may be used in conjunction with various hardware architectures herein described and used to implement various embodiments.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as the machine 1300 of FIG. 13 that includes, among other things, processors 1304, memory 1314, and I/O components 1318. A representative hardware layer 1252 is illustrated and can represent, for example, the machine 1200 of FIG. 12. The representative hardware layer 1252 includes a processing unit 1254 having associated executable instructions 1204. Executable instructions 1204 represent the executable instructions of the software architecture 1206, including implementation of the methods, components and so forth described herein. The hardware layer 1252 also includes memory and/or storage modules memory/storage 1256, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, applications 1216 and a presentation layer 1214. Operationally, the applications 1216 and/or other components within the layers may invoke application programming interface (API) API calls 1208 through the software stack and receive a response as in response to the API calls 1208. The layers illustrated are representative in nature and not all software architectures have all layers. For example, some mobile or special purpose operating systems may not provide a frameworks/ middleware 1218, while others may provide such a layer. Other software architectures may include additional or different layers.

The operating system 1202 may manage hardware resources and provide common services. The operating system 1202 may include, for example, a kernel 1222, services 1224 and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built in operating system functions (e.g., kernel 1222, services 1224 and/or drivers 1226), libraries 1220, and frameworks/middleware 1218 to create user interfaces to interact with users of the system. Alternatively, or additionally, in some systems interactions with a user may occur through a presentation layer, such as presentation layer 1214. In these systems, the application/ component "logic" can be separated from the aspects of the application/component that interact with a user.

Figure 13:
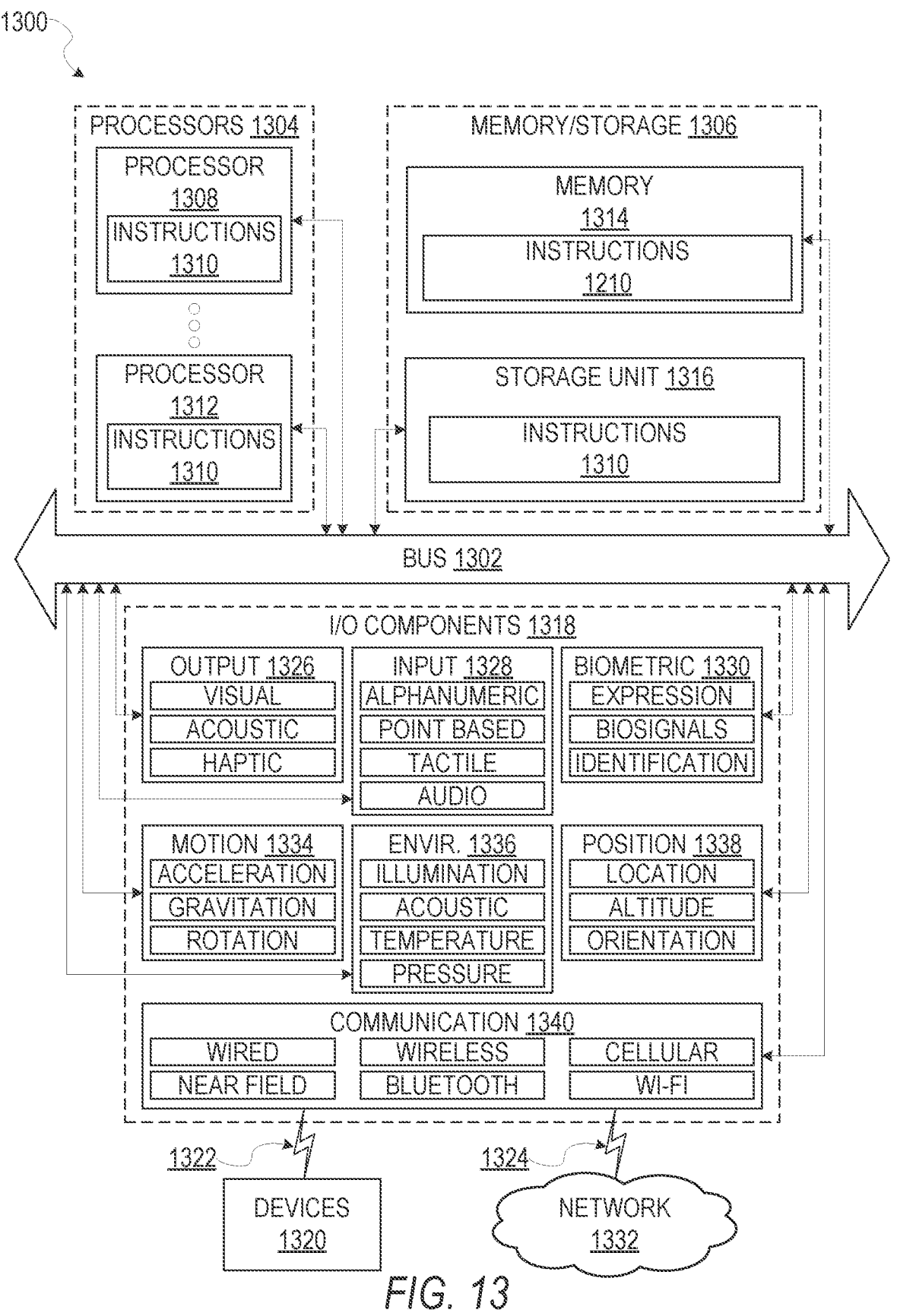
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental environment components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1322 and coupling 1324 respectively. For example, the communication components 1340 may include a network interface component or other suitable device to interface with the network 1332. In further examples, communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a Universal Serial Bus (USB)).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1340, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, net-books, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EIVIPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
causing display of a graphical user interface (GUI) at a client device, the GUI comprising a menu element that includes a list of one or more user identifiers that a user associated with the client device has communicated with within a predefined threshold period of time;
receiving, from the user associated with the client device, a selection of a user identifier from among the list of the one or more user identifiers;
causing display of a presentation of one or more group identifiers associated with one or more user groups that include the user identifier identified by the selection;
receiving an input that assigns a theme from among a plurality of predefined themes to a user group from among the one or more user groups, the theme comprising one or more graphical elements;
generating a new group identifier for the user group based on at least a graphical avatar associated with the user and the one or more graphical elements associated with the theme;
causing display of the new group identifier at the client device;
receiving an input that selects the new group identifier, the input comprising an input attribute, the input attribute comprising at least one of a duration of a tactile input applied to the client device or a pressure amount of a tactile input applied to the client device;
determining that the input attribute transgresses a predefined threshold value; and
in response to determining that the input attribute transgresses the predefined threshold value, presenting a display of the user group that comprises one or more user identifiers associated with the user group identified by the new group identifier, and one or more media items shared within the user group.

2. The method of claim 1, further comprising presenting a recommended set of user identifiers in response to receiving the input, the recommended set of user identifiers being generated based on a communication history.

3. The method of claim 1, wherein the predefined threshold value comprises a predetermined period of time.

4. The method of claim 1, wherein the predefined threshold value comprises a threshold pressure.

5. The method of claim 1, wherein determining that the input attribute transgresses the predefined threshold value comprises comparing the pressure amount of the tactile input to a threshold pressure.

6. The method of claim 1, wherein the client device comprises a touch-input enabled device configured to receive the tactile input.

7. The method of claim 1, wherein determining that the input attribute transgresses the predefined threshold value comprises comparing the duration of the tactile input to a predefined time period.

8. The method of claim 1, wherein the plurality of predefined themes includes a sports theme.

9. The method of claim 8, wherein the sports theme comprises graphical elements including sporting equipment.

10. A system comprising:

a memory; and at least one hardware processor coupled to the memory and comprising instructions that causes the system to perform operations comprising:

causing display of a graphical user interface (GUI) at a client device, the GUI comprising a menu element that includes a list of one or more user identifiers that a user associated with the client device has communicated with within a predefined threshold period of time;

receiving, from the user associated with the client device, a selection of a user identifier from among the list of the one or more user identifiers;

causing display of a presentation of one or more group identifiers associated with one or more user groups that include the user identifier identified by the selection;

receiving an input that assigns a theme from among a plurality of predefined themes to a user group from among the one or more user groups, the theme comprising one or more graphical elements;

generating a new group identifier for the user group based on at least a graphical avatar associated with the user and the one or more graphical elements associated with the theme;

causing display of the new group identifier at the client device;

receiving an input that selects the new group identifier, the input comprising an input attribute, the input attribute comprising at least one of a duration of a tactile input applied to the client device or a pressure amount of a tactile input applied to the client device;

determining that the input attribute transgresses a predefined threshold value; and in response to determining that the input attribute transgresses the predefined threshold value, presenting a display of the user group that comprises one or more user identifiers associated with the user group identified by the new group identifier, and one or more media items shared within the user group.

11. The system of claim 10, further comprising presenting a recommended set of user identifiers in response to receiving the input, the recommended set of user identifiers being generated based on a communication history.

12. A non-transitory machine-readable storage medium comprising instructions that, when executed by one or more processors of a machine, cause the machine to perform operations comprising:

causing display of a graphical user interface (GUI) at a client device, the GUI comprising a menu element that includes a list of one or more user identifiers that a user associated with the client device has communicated with within a predefined threshold period of time;

receiving, from the user associated with the client device, a selection of a user identifier from among the list of the one or more user identifiers;

causing display of a presentation of one or more group identifiers associated with one or more user groups that include the user identifier identified by the selection;

receiving an input that assigns a theme from among a plurality of predefined themes to a user group from among the one or more user groups, the theme comprising one or more graphical elements;

generating a new group identifier for the user group based on at least a graphical avatar associated with the user and the one or more graphical elements associated with the theme;

causing display of the new group identifier at the client device;

receiving an input that selects the new group identifier, the input comprising an input attribute, the input attribute comprising at least one of a duration of a tactile input applied to the client device or a pressure amount of a tactile input applied to the client device;

determining that the input attribute transgresses a predefined threshold value; and in response to determining that the input attribute transgresses the predefined threshold value, presenting a display of the user group that comprises one or more user identifiers associated with the user group identified by the new group identifier, and one or more media items shared within the user group.

13. The non-transitory machine-readable storage medium of claim 12, wherein the instructions further cause the machine to perform operations comprising presenting a recommended set of user identifiers in response to receiving the input, the recommended set of user identifiers being generated based on a communication history.

* * * * *